(12) United States Patent
Ucasz et al.

(10) Patent No.: US 12,145,893 B2
(45) Date of Patent: Nov. 19, 2024

(54) COATING REPAIR FOR CERAMIC MATRIX COMPOSITE (CMC) SUBSTRATES

(71) Applicant: Raytheon Technologies Corporation, Farmington, CT (US)

(72) Inventors: Mark T. Ucasz, Middletown, CT (US); Tania Bhatia Kashyap, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 825 days.

(21) Appl. No.: 17/269,083

(22) PCT Filed: Jul. 24, 2019

(86) PCT No.: PCT/US2019/043205
§ 371 (c)(1),
(2) Date: Feb. 17, 2021

(87) PCT Pub. No.: WO2020/036713
PCT Pub. Date: Feb. 20, 2020

(65) Prior Publication Data
US 2021/0171409 A1 Jun. 10, 2021

Related U.S. Application Data

(60) Provisional application No. 62/827,663, filed on Apr. 1, 2019, provisional application No. 62/719,307, filed on Aug. 17, 2018.

(51) Int. Cl.
*C04B 41/00* (2006.01)
*C04B 35/80* (2006.01)
(Continued)

(52) U.S. Cl.
CPC .......... *C04B 41/009* (2013.01); *C04B 35/80* (2013.01); *C04B 41/0072* (2013.01);
(Continued)

(58) Field of Classification Search
CPC .......... C04B 41/4527; C04B 41/4535; C04B 41/4539; C04B 41/4543
See application file for complete search history.

(56) References Cited

U.S. PATENT DOCUMENTS 6,963,044 B2 11/2005 Fusaro, Jr. et al.
8,367,967 B2 2/2013 Zajchowski et al.
(Continued)

FOREIGN PATENT DOCUMENTS

WO 2014/149124 A1 12/2013
WO 2018/128676 A1 7/2018

OTHER PUBLICATIONS

Poerschke, Thermochemical compatibility of ytterbia-(hafnia/silica) multilayers for environmental barrier coatings, Acta Materialia, vol. 61, Issue 18, Oct. 2013, p. 6743-6755 (Year: 2013).*
(Continued)

*Primary Examiner* — Tabatha L Penny
(74) *Attorney, Agent, or Firm* — Bachman & LaPointe, P.C.

(57) ABSTRACT

In a method for repairing a coated article, the article has: a ceramic matrix composite (CMC) substrate; and a coating system having a plurality of layers. A damage site at least partially penetrates at least one of the layers. The method includes: applying a slurry of a repair material to the damage site for repairing a first of the penetrated layers; and after the applying, heating the repair material with a plasma torch.

21 Claims, 4 Drawing Sheets

(51) Int. Cl.
  *C04B 41/50* (2006.01)
  *C04B 41/87* (2006.01)
  *C23C 4/11* (2016.01)
  *C23C 4/134* (2016.01)
  *F01D 5/00* (2006.01)

(52) U.S. Cl.
  CPC ...... *C04B 41/5024* (2013.01); *C04B 41/5042* (2013.01); *C04B 41/5053* (2013.01); *C04B 41/5096* (2013.01); *C04B 41/87* (2013.01); *C23C 4/11* (2016.01); *C23C 4/134* (2016.01); *F01D 5/005* (2013.01); *C04B 2235/3826* (2013.01); *C04B 2235/5244* (2013.01); *F05D 2220/32* (2013.01); *F05D 2230/80* (2013.01); *F05D 2230/90* (2013.01); *F05D 2300/6033* (2013.01)

(56) References Cited

U.S. PATENT DOCUMENTS

| | | | |
|---|---|---|---|
| 8,475,945 | B2 | 7/2013 | Schmidt et al. |
| 8,999,457 | B2 | 4/2015 | Kirby et al. |
| 9,005,716 | B2 | 4/2015 | Kirby et al. |
| 9,005,717 | B2 | 4/2015 | Kirby et al. |
| 9,023,435 | B2 | 5/2015 | Kirby et al. |
| 9,056,802 | B2 | 6/2015 | Kirby et al. |
| 9,540,497 | B2 | 1/2017 | Lipkin et al. |
| 9,771,826 | B2 | 9/2017 | Kirby et al. |
| 9,926,805 | B2 | 3/2018 | Kirby et al. |
| 10,392,312 | B2 | 8/2019 | Tang et al. |
| 2005/0249977 | A1* | 11/2005 | Hisamatsu ............... C04B 41/89 428/701 |
| 2005/0255648 | A1 | 11/2005 | Bhatia et al. |
| 2008/0138624 | A1 | 6/2008 | Lewis et al. |
| 2009/0162539 | A1* | 6/2009 | Boutwell ................ B23P 6/005 427/140 |
| 2009/0324930 | A1 | 12/2009 | Tulyani et al. |
| 2011/0219775 | A1 | 9/2011 | Jarmon et al. |
| 2014/0272249 | A1* | 9/2014 | Lee .......................... C04B 41/50 427/140 |
| 2014/0272467 | A1 | 9/2014 | Schaeffer et al. |
| 2015/0075714 | A1* | 3/2015 | Sun ............................ C23C 4/10 427/446 |
| 2016/0160664 | A1 | 6/2016 | Luthra et al. |
| 2016/0215645 | A1 | 7/2016 | McCaffrey |
| 2016/0281204 | A1* | 9/2016 | Ucasz ..................... F23R 3/002 |
| 2016/0332922 | A1 | 11/2016 | Tang et al. |
| 2016/0333454 | A1* | 11/2016 | Tang ......................... C23C 4/04 |
| 2017/0350268 | A1 | 12/2017 | McCaffrey |
| 2018/0050964 | A1* | 2/2018 | McEvoy ............. C04B 41/5042 |
| 2019/0119803 | A1 | 4/2019 | Tang et al. |

OTHER PUBLICATIONS

European extended search report dated Jul. 11, 2022 for European Patent Application No. 19849844.6.
"Compact Plasma Spray (CPS) System" Instruction Manual, May 25, 2007, Sulzer Metco, Westbury, New York.
International Search Report and Written Opinion dated Oct. 24, 2019 for PCT/US19/43205.
European partial supplementary search report dated Apr. 8, 2022 for European Patent Application No. 19849844.6.
Partial European Search Report dated Jun. 14, 2024, for European Patent Application No. 24160632.6.

* cited by examiner

COATING REPAIR FOR CERAMIC MATRIX COMPOSITE (CMC) SUBSTRATES

CROSS-REFERENCE TO RELATED APPLICATIONS

Benefit is claimed of U.S. Patent Application No. 62/827,663, filed Apr. 1, 2019, and entitled "Coating Repair for Ceramic Matrix Composite (CMC) Substrates" and U.S. Patent Application No. 62/719,307, filed Aug. 17, 2018, and entitled "Coating Repair for Ceramic Matrix Composite (CMC) Substrates", the disclosures of which are incorporated by reference herein in their entireties as if set forth at length.

BACKGROUND

The disclosure relates to coatings for ceramic matrix composite (CMC) substrates. More particularly, the disclosure relates to repair of such coatings.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades. An engine case of an engine static structure may include one or more blade outer air seals (BOAS), which are typically formed of metal, that establish an outer radial flow path boundary for channeling the hot combustion gases.

Ceramic matrix composites (CMC) have been proposed for use on engine components such as blades, vanes, combustor components (e.g., can combustors and bulkheads and frustoconical panel segments of annular combustors and associated nozzles), and BOAS. Exemplary CMC are SiC fiber-reinforced SiC matrix (SiC—SiC) composites.

United States Patent Application Publication 20170350268 A1 (the '268 publication), of McCaffrey, published Dec. 7, 2017, "Blade Outer Air Seal Made of Ceramic Matrix Composite", discloses a ceramic matrix composite blade outer air seal segment. The disclosure of the '268 publication is incorporated by reference in its entirety herein as if set forth at length.

United States Patent Application Publication 20160215645 A1 (the '645 publication), of McCaffrey, published Jul. 28, 2016, "Blade Outer Air Seal Made of Ceramic Matrix Composite", discloses a ceramic matrix composite blade outer air seal segment. The disclosure of the '645 publication is incorporated by reference in its entirety herein as if set forth at length.

United States Patent Application Publication 20110219775 A1 (the '775 publication), of Jarmon, et al., published Sep. 15, 2011, "High Tolerance Controlled Surface for Ceramic Matrix Composite Component", discloses ceramic matrix composite materials with a sprayed hard coating. The disclosure of the '775 publication is incorporated by reference in its entirety herein as if set forth at length.

United States Patent Application Publication 20160332922 A1 (the '922 publication), of Tang et al., published Nov. 17, 2016, "Silicon Oxycarbide Environmental Barrier Coating", discloses a coating for CMC comprising SiOC, BMAS, and $SiO_2$. Application is as a slurry. The disclosure of the '922 publication is incorporated by reference in its entirety herein as if set forth at length.

U.S. Pat. No. 8,475,945 (the '945 patent), of Schmidt et al., Jul. 2, 2013, "Composite article including silicon oxycarbide layer", discloses coating systems including a silicon oxycarbide layer beneath a hafnia-containing layer. The disclosure of the '945 patent is incorporated by reference in its entirety herein as if set forth at length.

United States Patent Application Publication 20050255648 A1 the '648 publication), of Bhatia et al., published Nov. 17, 2005, "Silicon based substrate hafnium oxide top environmental/thermal top barrier layer and method for preparing", discloses coating systems having a hafnia-based outer layer and barium strontium aluminosilicate (BSAS)-containing intermediate layer. Coatings may generally be along the gaspath-facing surfaces of such components including the inner diameter (ID) concave face of BOAS, the airfoil and platform or shroud surfaces of blades and vanes and interior surfaces of combustor panels. The disclosure of the '648 publication is incorporated by reference in its entirety herein as if set forth at length.

Separately, U.S. Pat. No. 8,367,967 (the '967 patent), of Zajchowski et al., Feb. 5, 2013, "Method and apparatus for repairing thermal barrier coatings", discloses use of a microplasma spray apparatus to repair thermal barrier coatings on metallic substrates. Such microplasma spray apparatus is available from Oerlikon Metco of Westbury, New York as the "Compact Plasma Spray (CPS) System". The disclosure of the '967 patent is incorporated by reference in its entirety herein as if set forth at length.

SUMMARY

One aspect of the disclosure involves a method for repairing a coated article. The article comprises: a ceramic matrix composite (CMC) substrate; and a coating system comprising a plurality of layers. A damage site at least partially penetrates at least one of the layers. The method comprises: applying a slurry of a repair material to the damage site for repairing a first of the penetrated layers; and after the applying, heating the repair material with a plasma torch.

A further embodiment of any of the foregoing embodiments may additionally and/or alternatively include plasma spray repair of another of the penetrated layers using a spray apparatus including said plasma torch.

A further embodiment of any of the foregoing embodiments may additionally and/or alternatively include said another of the penetrated layers comprising one or more of hafnium dioxide ($HfO_2$), hafnium silicate ($HfSiO_4$), zirconium silicate ($ZrSiO_4$), barium strontium aluminosilicates (BSAS), strontium aluminosilicates (SAS), barium aluminosilicates (BAS), and rare earth silicates.

A further embodiment of any of the foregoing embodiments may additionally and/or alternatively include the repair material comprising silicon oxycarbide.

A further embodiment of any of the foregoing embodiments may additionally and/or alternatively include the method being performed in situ on an engine.

A further embodiment of any of the foregoing embodiments may additionally and/or alternatively include cleaning the damage site.

A further embodiment of any of the foregoing embodiments may additionally and/or alternatively include the cleaning comprising a machining.

A further embodiment of any of the foregoing embodiments may additionally and/or alternatively include the ceramic matrix composite substrate being a SiC fiber-reinforced SiC matrix substrate.

A further embodiment of any of the foregoing embodiments may additionally and/or alternatively include the substrate being an airfoil substrate.

Another aspect of the disclosure involves a method for repairing a coated article. The article comprises: a ceramic matrix composite (CMC) substrate; and a coating system comprising a hafnium oxide ($HfO_2$)-based layer. A damage site at least partially penetrates the $HfO_2$-based layer. The method comprises forming a repair layer by plasma spray of a hafnium oxide ($HfO_2$)-based filler into the damage site.

A further embodiment of any of the foregoing embodiments may additionally and/or alternatively include the repair layer having a depthwise gradation of calcium magnesium alumino-silicate (CMAS).

A further embodiment of any of the foregoing embodiments may additionally and/or alternatively include the plasma spray of the hafnium oxide ($HfO_2$)-based filler into the damage site comprising spraying said depthwise gradation of calcium magnesium alumino-silicate (CMAS).

A further embodiment of any of the foregoing embodiments may additionally and/or alternatively include the depthwise gradation comprising at least a 10% change in content of CMAS.

A further embodiment of any of the foregoing embodiments may additionally and/or alternatively include a net CMAS content of the $HfO_2$-based filler sprayed into the damage site being 5% to 20% by weight.

A further embodiment of any of the foregoing embodiments may additionally and/or alternatively include a thickness of the $HfO_2$-based layer being 50 micrometers to 200 micrometers.

A further embodiment of any of the foregoing embodiments may additionally and/or alternatively include the hafnium oxide ($HfO_2$)-based filler further comprising silicon.

A further embodiment of any of the foregoing embodiments may additionally and/or alternatively include the forming a repair layer by plasma spray of a hafnium oxide ($HfO_2$)-based filler into the damage site comprising spraying alternating layers including first layers comprising said hafnium oxide and second layers comprising silicon.

A further embodiment of any of the foregoing embodiments may additionally and/or alternatively include the damage site penetrating a further layer below the $HfO_2$-based layer and the method further comprising plasma spray restoration of the further layer.

Another aspect of the disclosure involves a method for repairing a coated article. The article comprises: a ceramic matrix composite (CMC) substrate; and a coating system comprising a plurality of layers. A damage site at least partially penetrates at least one of the layers, the method comprises forming a repair layer by plasma spray or slurry depositing of a filler into the damage site, the filler having a depthwise gradation of calcium magnesium aluminosilicate (CMAS).

A further embodiment of any of the foregoing embodiments may additionally and/or alternatively include the depthwise gradation comprising at least a 10% change in content of CMAS.

A further embodiment of any of the foregoing embodiments may additionally and/or alternatively include the filler being $HfO_2$-based.

A further embodiment of any of the foregoing embodiments may additionally and/or alternatively include a net CMAS content of the $HfO_2$-based filler sprayed into the damage site being 5% to 20% by weight.

A further embodiment of any of the foregoing embodiments may additionally and/or alternatively include the forming providing the depthwise gradation by progressively varying a CMAS concentration of a spray.

Another aspect of the disclosure involves a method for repairing a coated article, the article comprising: a ceramic matrix composite (CMC) substrate; and a coating system comprising: a silicon-based layer; and a damage site at least partially penetrating the silicon-based layer. The method comprises: forming a repair layer by forming respective sublayers of: silicon; and hafnium oxide.

A further embodiment of any of the foregoing embodiments may additionally and/or alternatively include the forming the repair layer further comprising forming respective sublayers of silica and hafnium silicate.

A further embodiment of any of the foregoing embodiments may additionally and/or alternatively the silicon-based layer being at least 40% by volume silicon.

A further embodiment of any of the foregoing embodiments may additionally and/or alternatively include the sublayers being deposited sequentially by spray deposition.

A further embodiment of any of the foregoing embodiments may additionally and/or alternatively include interdiffusing the sublayers.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
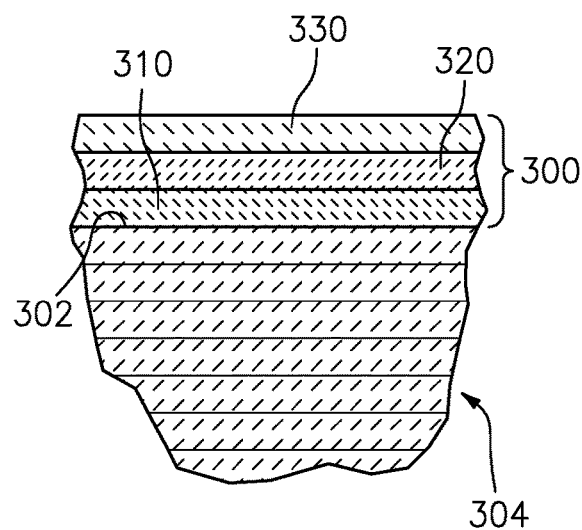
FIG. 1 is a partial schematic cross-sectional view of a coated article.

FIG. 1 shows an exemplary coating system (coating) 300 atop a surface 302 of a substrate 304 (e.g., a CMC substrate of a part such as a blade, vane, BOAS, or the like). The exemplary coating system is a three-layer system. A first layer 310 is formed by applying a mixture of silicon oxycarbide (SiOC) and silicon dioxide ($SiO_2$). Exemplary silicon oxycarbide is relatively fine (e.g., particle size in the range of 0.10 micrometer to 45.0 micrometers (e.g., −325 mesh which would limit to below 45.0 micrometers), more narrowly 1 micrometer to 25 micrometers). The majority by mass may be in the higher end of the range. For example, the mass median particle may be equal to or above 10 micrometers or equal to or above 20 micrometers (while still equal to or lower than the 45.0 micrometers or 25.0 micrometers alternate upper ends of that range).

The silicon dioxide serves as a matrix between the SiOC particles. Exemplary silicon dioxide is sourced as a colloidal silica. An exemplary thickness of the layer is 25 micrometers to 75 micrometers.

Alternate coating constructions could include a continuous layer of elemental silicon (e.g., >98.0% purity) or of discrete particles of silicon in an oxide based matrix. Exemplary elemental silicon content is at least 25% by volume excluding porosity, if any (e.g., 25% to 75% or at least 40% or 40% to 75% or at least 50% or 50% to 75%). Exemplary matrix materials include one or more of hafnium oxide, hafnium silicate, silica, BMAS (barium magnesium aluminosilicate), rare earth silicates, zirconium oxide, and zirconium silicate. One key area of matrix examples includes silica and/or silicates (e.g., rare earth silicate(s) and/or hafnium silicate) as the matrix or majority thereof. Exemplary content of such oxide matrix is at least 10% by volume excluding porosity, if any (e.g., 10% to 50% or 10% to 45% or 15% to 40%). Porosity, if any may be incidental and advantageously not more than 10% or not more than 5%. This layer could replace the layer 310 or precede and intervene between it and the substrate (e.g., layer 305 of coating 300' in FIG. 5). Nonlimiting examples include: 50% to 75% silicon with 10% to 30% silica, balance, if any, reaction products, additions, impurities and/or porosity; 50% to 75% silicon with 10% to 30% rare earth silicate(s) and/or hafnium silicate (e.g., 15% to 20% rare earth silicate (s) and 10% to 15% hafnium silicate), balance, if any, reaction products, additions, impurities and/or porosity.

The SiOC based layer 310 may be applied as a slurry (e.g., with an aqueous and/or alcohol-based carrier (e.g., ethanol) and may be applied via dipping, air spraying, ultrasonic coating, brushing, and the like). Post application of this layer, the substrate may be heated to crosslink and drive off any polymers and/or slurry additives. Exemplary polymers and/or slurry additives include polyethylene glycol (PEG) which is used as a binder and dispersant. The heating (e.g., furnace heating) is effective to leave a structure of solid particles. Exemplary silicon oxycarbide is at least 40 weight percent (e.g., 50% to 90% or 60% to 80%) of the layer and exemplary silica is at least 10 weight percent (e.g., 10% to 60% or 20% to 40%). The layer (pre-use) may consist essentially of the combined silicon oxycarbide and silica (e.g., 95% or more or 98% or more by weight). They may represent similar contents of the non-fugitive (if any) material in the carrier.

The aforementioned layer of metallic silicon 305, if present, may be applied using air plasma spray.

A second layer 320 is formed by applying a combination of silicon oxycarbide and an additional particulate for assisting in formation of a sealing layer. Exemplary additional particulates are aluminosilicates (namely one or more of BMAS (barium magnesium aluminosilicate), BAS (barium aluminosilicate), BSAS, (barium strontium aluminosilicate) SAS (strontium aluminosilicate), and/or silicon dioxide. In this layer, the silicon oxycarbide particles may be relatively coarse (e.g., 25-100 micrometers) so as to provide oxidation protection to the substrate. The additive helps seal as discussed below. An exemplary thickness of the layer is 100 micrometers to 125 micrometers. Exemplary silicon oxycarbide is at least 40 weight percent (e.g., at least 45% or 45% to 65%) of the layer and exemplary additional particulates are at least 30 weight percent. They may represent similar contents of the non-fugitive (if any) material in the carrier. Alternatively, exemplary range by volume, 1-30% BMAS/BSAS/BAS/SAS combined, by volume 5-40% $SiO_2$ and 30%-94% SiOC (see '922 publication).

Similarly to the layer 310, the layer 320 mixture of powders may be applied as a slurry and post-heated. In addition to the driving off of the slurry carrier and its additives, the heating may melt the additional particulate to flow into and fill porosity between the oxycarbide particles.

The exemplary third layer 330 (outer or outboardmost in this example) is a hafnium dioxide (hafnia, $HfO_2$)-based layer material. This material may be applied by air plasma spray of dry powder (alternative being physical vapor deposition and other plasma spray techniques). As-applied (e.g., after any bake-out or reaction of carrier material, fugitive material, and the like), the third layer is at least 50% by weight $HfO_2$, more particularly, at least 70% or at least 90%. An exemplary thickness of the layer is 50 micrometer to 100 micrometer, more broadly 50 micrometer to 200 micrometer, or 30 micrometer to 300 micrometer.

Alternative third layer (thus potentially top layer in other layerings) compositions comprise one or more of hafnium silicate ($HfSiO_4$), zirconium silicate ($ZrSiO_4$), barium strontium aluminosilicates (BSAS), strontium aluminosilicates (SAS), barium aluminosilicates(BAS), and rare earth silicates. Exemplary rare earth silicates include mono or disilicates of yttrium, ytterbium, gadolinium, scandium, erbium, lutetium, lanthanum, samarium, scandium and combinations thereof. Alternatively, the silicates could be blended with oxides of hafnium, zirconium and/or rare-earth oxides.

The coating may be subject to damage under various scenarios. Even before use, the possibility exists of nicks at least partially penetrating one or more of the layers. In-use there may be a variety of sources of such penetrations. Typical in-use penetrations are along the airfoils of blades and vanes and may be due to impact such as foreign object damage or damage to one coating from coating particles shed upstream.

Additionally, in-use the coating may be subject to molten sand attack otherwise known as calcium magnesium alumino-silicate (CMAS) attack. This may involve CMAS penetrating into at least the outermost layer 330. In addition to CMAS creating the possibility of penetration due to spalling, it means the coating aside and further away from the penetration has a composition altered from the original state.

Figure 2:
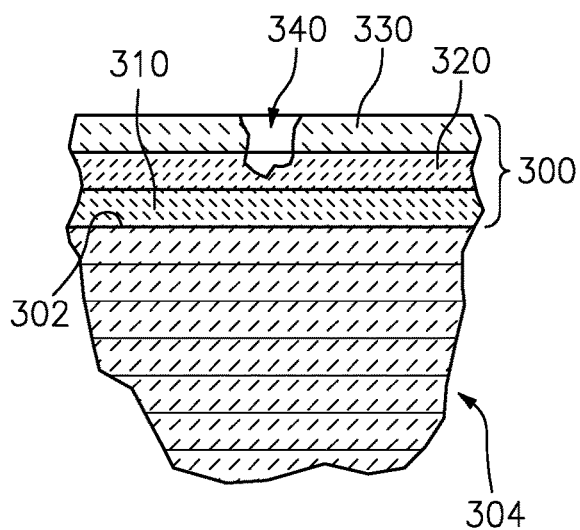
FIG. 2 is a partial schematic cross-sectional view of the article with a damage site.
Figure 3:
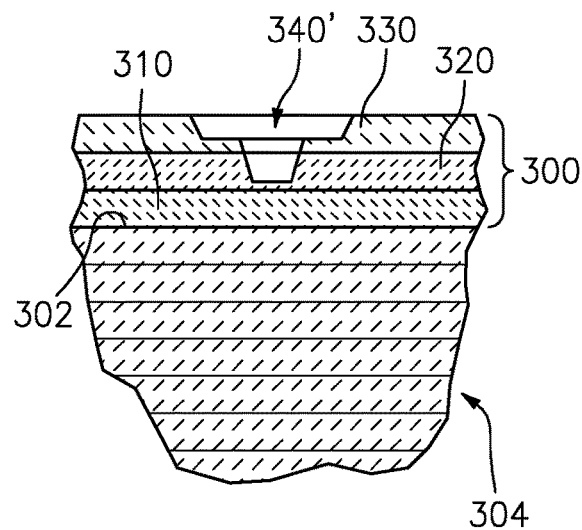
FIG. 3 is a partial schematic sectional view of the article with the damage site cleaned.

FIG. 2 shows a damage site in the form of a penetration 340 penetrating the outermost layer 330 and intermediate layer 320. An exemplary first repair process for this damage site generally preserves the layers. There may be an initial cleaning of the site prior to repair. This cleaning may include a chemical cleaning, may include a grit blasting, or may include machining (e.g., using a drill or milling bit to provide a clean even surface of cleaned penetration 340' for spray deposition of repair material) (FIG. 3).

The exemplary cleaned penetration 340' is left with a stepped shape akin to a counterbore that provides enhanced surface area for bonding between repair material and the original/prior material.

Several examples of repair involve use of microplasma spray deposition for one or more layers and/or non-plasma deposition (e.g., applying slurry as discussed for original manufacture as noted above) for one or more layers. For non-plasma application, the post-application heating may be via the torch from a microplasma spray apparatus.

In one example of penetration of multiple layers and repair of multiple layers, a first repair 350 (FIG. 4) may be of the same material originally used to apply the second layer 320. An example of the repair involves a slurry spray (non-plasma). Alternatives include brush application of the slurry. After spray, there may be a heating. As per the original process, the heating may be performed with the torch of the same plasma spray apparatus used for one of the other layers (e.g., a standard plasma spray apparatus used in the initial application and a microplasma spray apparatus used in the repair).

Figure 4:
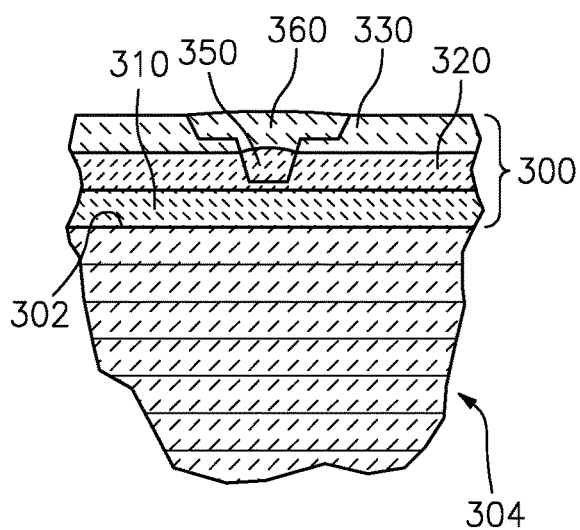
FIG. 4 is a partial schematic sectional view of the article with the damage site repaired.

Then, the outer layer 330 may be similarly repaired with material 360 (FIG. 4). In the particular example of a hafnia-based outer layer 330 and an oxycarbide-containing intermediate layer 320, this repair may be a microplasma spray repair using the same torch as was used to heat the repair material of the intermediate layer 320.

The various repair materials may be applied to the approximate thicknesses of the associated layer being repaired (e.g., within 10% or 20%). Or they may be applied moderately thicker and then ground down.

Such a repair may be performed "on-wing" while the part is on the engine or may be performed after removing the part.

In a further variation, the article has been in service and thus the outer layer 330 has been subject to CMAS infiltration. In general, the layer 330 may still have the $HfO_2$ as a largest by weight constituent and may still be at least 50% $HfO_2$. This leaves the outer layer with a graded concentration of CMAS higher toward its exposed outer surface. Applying repair material of the initial composition may lead to mismatch (e.g., coefficient of thermal expansion (CTE) mismatch and/or thermal conductivity mismatch). Accordingly, a further example applies repair material as a graded combination 360 of the original material and CMAS powder. For example, an exemplary gradation involves an approximately linear change from zero at the base of the material 360 repairing layer 330 to 25 weight percent at the outer surface. More generally, the gradation may be from a low of less than 15 weight percent or less than 10 weight percent to a peak in the range of 20 weight percent to 30 weight percent. More generally, the gradation may occur over a span of at least 20% of the thickness of the material 360 and a delta in that concentration may be at least 10%. An exemplary average (e.g., a depth-wise mean or an overall mean) may be an exemplary 5% to 20% by weight CMAS, more broadly, 0% to 30%.

The gradation may be achieved by progressively varying the balance between a first powder source of the hafnium dioxide (and any other components of the original outer layer) and a second powder source of the CMAS (and any other powders that correspond to service contaminants of the outer layer).

Further variations to create a CMAS gradation include applying the material 360 without CMAS and then locally applying CMAS powder and heating to infiltrate (e.g., furnace heating or plasma torch (e.g., the same torch used to spray one or more of the repair layers)). Or, the CMAS may be applied as a suspension and dried and further heated to infiltrate (e.g., furnace heating or plasma torch (e.g., the same torch used to spray one or more of the repair layers)).

Yet further variations involve layering. For example after one or more sublayers of the layer 360 are applied, some CMAS may be applied before the next sublayer(s), and so forth. The amount of CMAS may be progressively increased.

Although the illustrated repair is of a three-layer coating where a penetration fully penetrates the outer layer 330 and just partially penetrates the next 320, and both have local repair, other situations are possible. A penetration within just the outer layer may feature repair of just the outer layer 330. A penetration into the layer 310 (further discussed below) may involve local repair of all three. A repair may involve entirely removing the outer layer 330 while locally repairing one or more layers below.

Layerings other than the three shown or their respective compositional orders may also be used. Rather than sharp boundaries between layers, there may be graded transitions. In the particular example above, gradation between layers 310 and 320 is particularly viable where the transition includes a transition in particle size of a given constituent (e.g., $SiO_2$). Compositional gradation is also possible.

In one area of alternatives, a base layer 305 of coating 300″ (FIG. 6) may be an essentially pure silicon (e.g., >98.0% purity). One further particular example of such a coating 300‴ (FIG. 7) then involves eliminating the layer 320 in addition to the FIG. 1 base layer 310).

Figure 5:
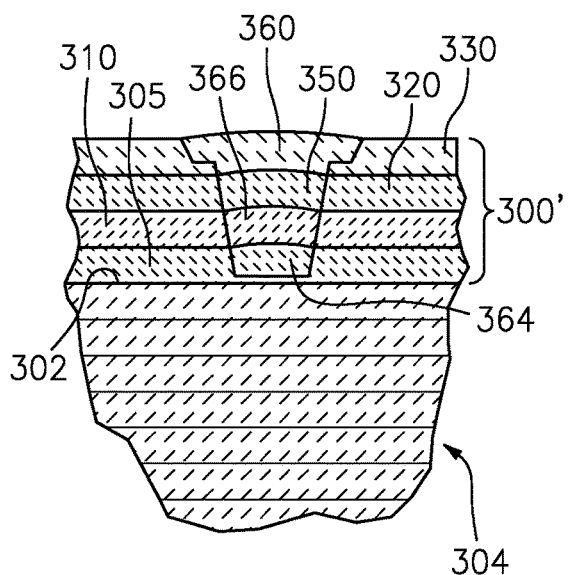
FIG. 5 is a partial schematic sectional view of a first alternate coated article with damage site repaired.

FIG. 5 shows an example of a similarly repaired penetration into the layer 305 of the coating 300′. A repair material 364 repairs the layer 305. This may be silicon based (e.g., essentially pure silicon noted above) (e.g., applied by microplasma spray). A repair material 366 repairs the layer 310. This may be of the same material originally used to apply the layer 310. It may be applied in similar fashion to material 350 repairing layer 320 described above. Then material 350 and 360 may be applied as described above. In an alternative example (not shown), the material 350 may be applied to repair both the layers 310 and 320.

Figure 6:
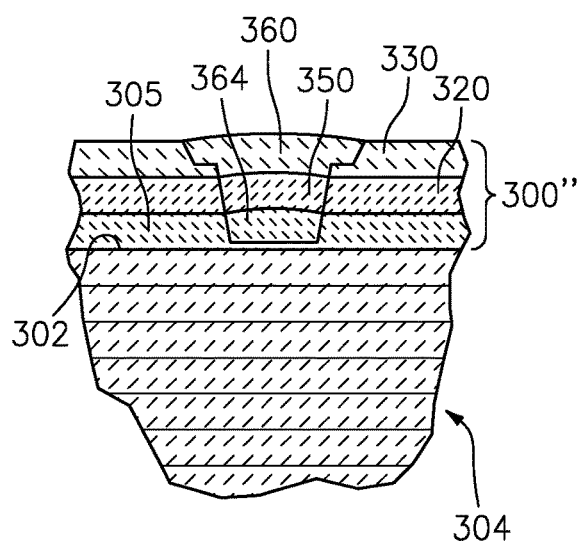
FIG. 6 is a partial schematic sectional view of a second alternate coated article with damage site repaired.
Figure 7:
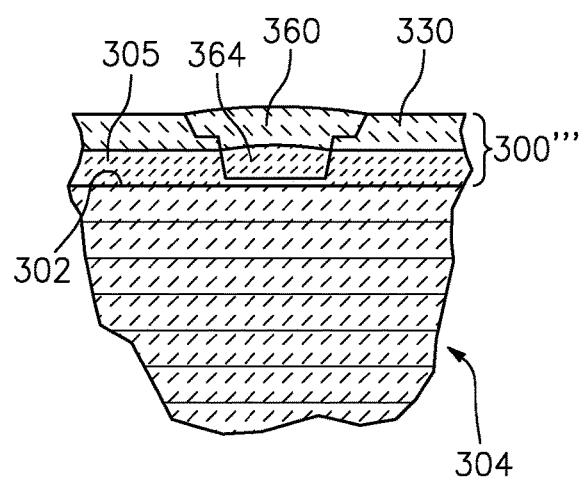
FIG. 7 is a partial schematic sectional view of a third alternate coated article with damage site repaired.

FIG. 6 shows an example of a similarly repaired penetration into the layer 305 of the coating 300″. FIG. 7 shows an example of a similarly penetration into the layer 305 of the coating 300‴.

Figure 8:
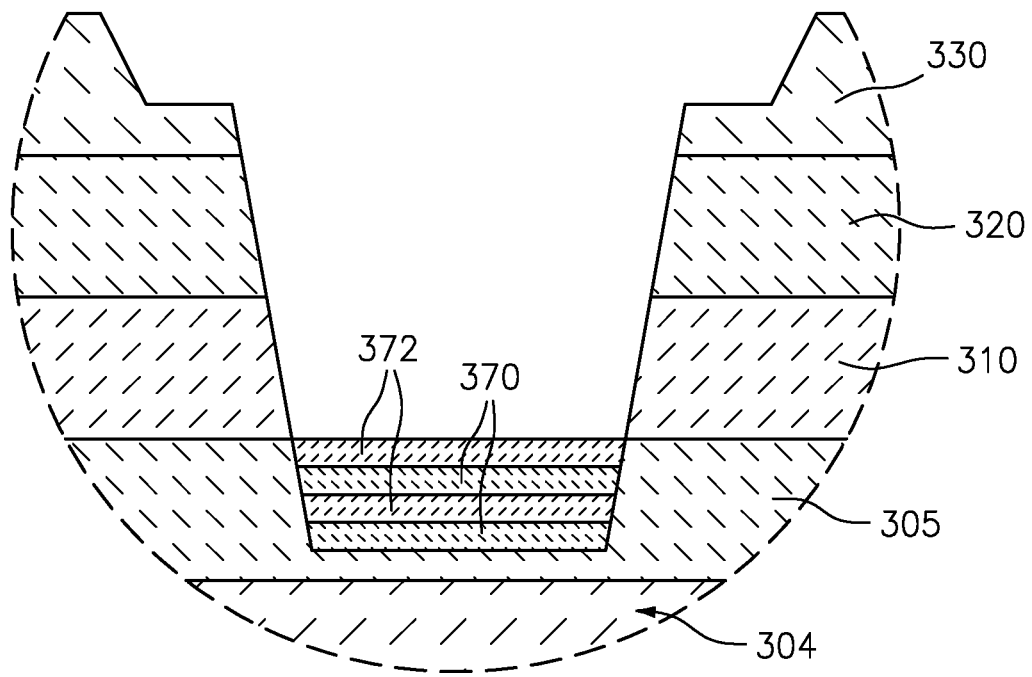
FIGS. 8 and 9 are partial schematic sectional views of two stages of an alternate repair to the first alternate coated article.
Figure 9:
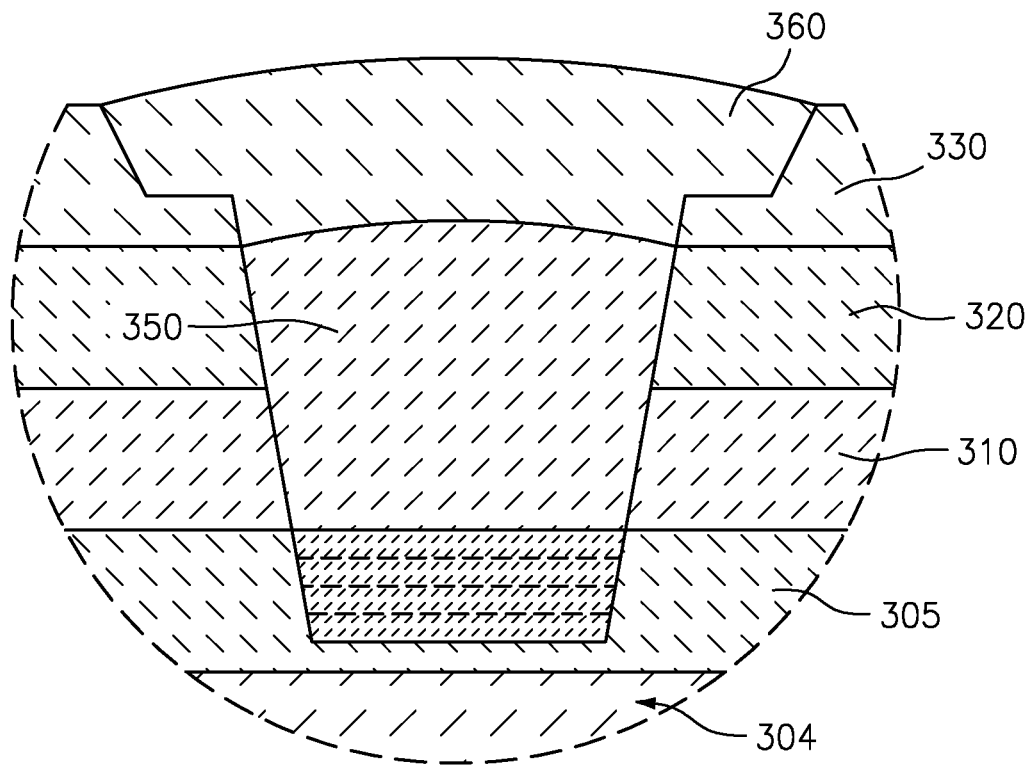
Figure 10:
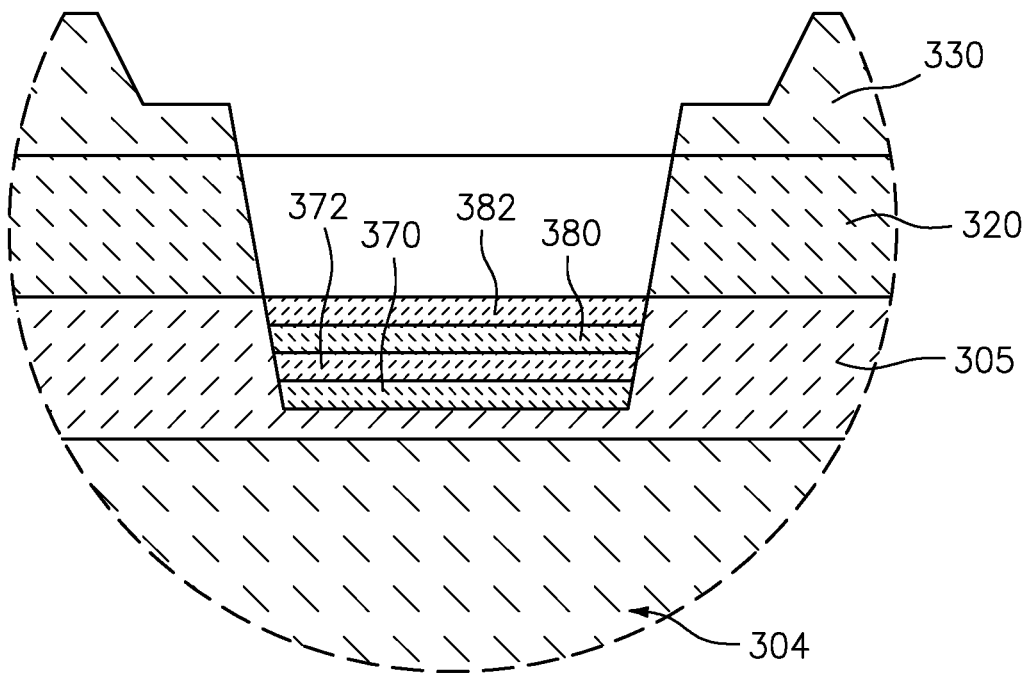
FIGS. 10 and 11 are partial schematic sectional views of two stages of an alternate repair to the second alternate coated article.
Figure 11:
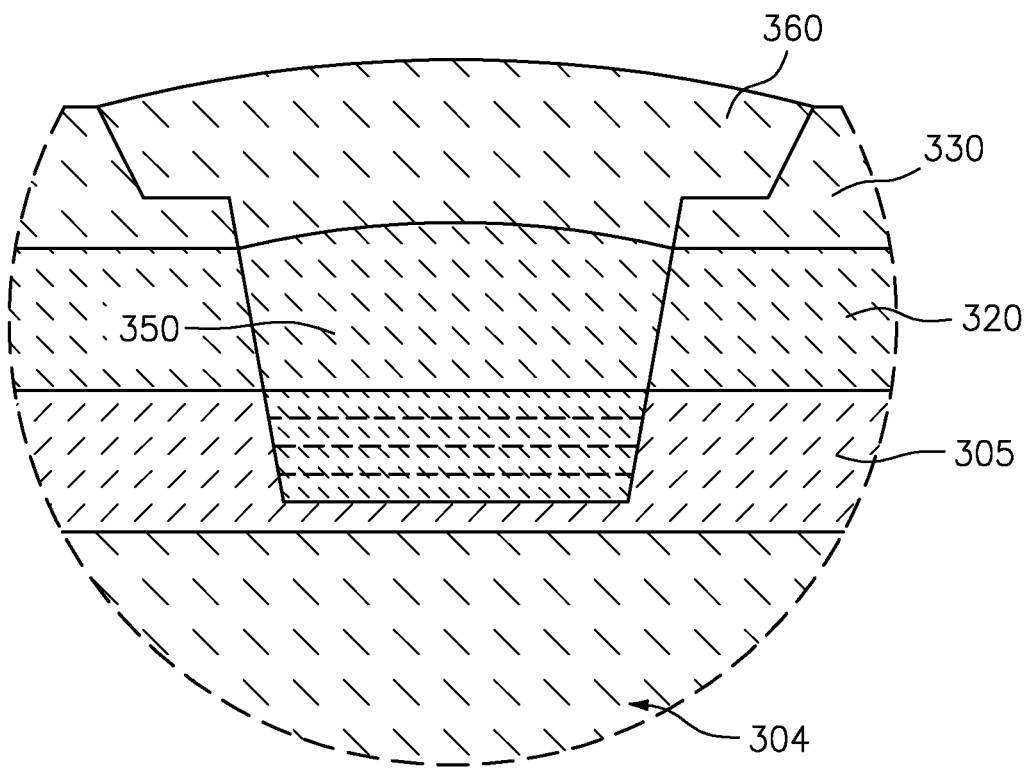

Discussed below, FIGS. 8 and 9 show an alternate example of a repaired penetration into the layer 305 of FIG. 5; FIGS. 10 and 11 show an alternate example of a repaired penetration into the layer 305 of FIG. 6.

In a coating system with such a silicon layer, the damage zone could reach up to 75-100 micrometer into the silicon layer (e.g., an exemplary 50 percent of layer thickness (more broadly 30% to 75%)). As above, there may be an initial cleaning of the site prior to repair. This cleaning may also include a chemical cleaning, may include a grit blasting or water jet cleaning or may include machining (e.g., using a drill or milling bit to provide a clean even surface of cleaned penetration 340′ for spray deposition of repair material. The microplasma torch would be used to restore the silicon layer at the damage site, then, followed by the build-up of the remainder of the coating either using slurry or microplasma spray.

Alternating layers/continuous sublayers of silicon and hafnium oxide may be applied to grade the composition and make the repaired layers more compatible. FIG. 8 shows such sublayers of silicon (or silicon dioxide) 370 and hafnium oxide 372 (e.g., both microplasma sprayed, or optionally slurry application of layer 372 such as noted above). FIG. 8 shows four total such layers 370, 372 within the depth of repair of the layer 305. A broader range of number of such layers is two to twenty or two to ten or four to ten. Heat treatment of such layers in an oxidizing environment between 1000 C-1450 C results in a final layered structure. One example of such final layered structure has each layer 370, 372 diffusing to essentially hafnium silicate but with a compositional gradient within/between such layers (FIG. 9). The illustrated FIG. 8 example has the material 350 repairing both the layers 310 and 320. Alternatively, the sublayering 370, 372 may extend further outward replacing some or all of the material 350 or other layerings may replace some or all of the material 350.

Another such sublayered structure (FIG. 10) involves a sequential sublayering of hafnium silicate 382, hafnium oxide 372, silicon 370, and silica 380. FIG. 10 shows four total such layers 370, 372, 380, 382 within the depth of repair of the layer 305 (e.g., all microplasma sprayed, or optionally slurry application of one or more of the layers 370, 372, 380, 382 such as noted above). A broader range of number of such layers is four to twenty or four to twelve (although a multiple of four is not required). The thickness of each of the alternating layers of silicon and hafnium oxide (and silica and hafnium silicate if present) could be 20-100 micrometers. FIG. 11 shows interdiffusion of the FIG. 10 layers with further layers atop.

The silicon layer 370 may be essentially pure silicon as described above. The hafnium oxide layer 372 may be at least 50% hafnia by weight or at least 90%. Moderate levels of zirconium impurities typically are included in commercial hafnium. The silica layer 380 may be at least 75% silica by weight or at least 90%. The hafnium silicate layer 382 may be may be at least 75% hafnium silicate by weight or at least 90%.

Alternative coating compositions used for the material 360 to repair layer 330, such as such as BSAS, SAS, rare-earth silicates, hafnium silicates, and/or zirconium silicates may be applied using a microplasma spray. These silicate compositions may also be applied such as using a slurry brush method and subsequently heated using the microplasma torch as a source of local heating to sinter/densify coating to improve adherence of the repaired region.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for repairing a coated article, the article comprising:
   a ceramic matrix composite (CMC) substrate; and
   a coating system comprising:
      a plurality of layers; and
      a damage site at least partially penetrating at least one of the layers, the method comprising:
         forming a repair layer by plasma spray or slurry depositing of a filler into the damage site, the filler having a depthwise gradation of calcium magnesium aluminosilicate (CMAS).

2. The method of claim 1 wherein:
   the filler comprises silicon oxycarbide.

3. The method of claim 1 wherein:
   the method is performed in situ on an engine.

4. The method of claim 1 further comprising:
   cleaning the damage site.

5. The method of claim 4 wherein the cleaning comprises:
   a machining.

6. The method of claim 1 wherein:
   the ceramic matrix composite substrate is a SiC fiber-reinforced SiC matrix substrate.

7. The method of claim 1 wherein:
   the substrate is an airfoil substrate.

8. The method of claim 1 wherein:
   the depthwise gradation comprises at least a 10% change in content of CMAS.

9. The method of claim 1 wherein:
   the filler is $HfO_2$-based.

10. The method of claim 9 wherein:
    a net CMAS content of the $HfO_2$-based filler sprayed into the damage site is 5% to 20% by weight.

11. The method of claim 1 wherein:
    the forming provides the depthwise gradation of CMAS by progressively varying a CMAS concentration of a spray.

12. The method of claim 11 wherein:
    the CMAS concentration of the spray has progressively varying balance between CMAS powder and another powder, the another powder comprising hafnium oxide powder.

13. A method for repairing a coated article, the article comprising:
    a ceramic matrix composite (CMC) substrate; and
    a coating system comprising:
       a silicon-based layer; and
       a damage site at least partially penetrating the silicon-based layer, the method comprising:
          forming a repair layer by forming respective sublayers of:
             silicon; and
             hafnium oxide,
   wherein:
      within a span of the silicon-based layer, the repair layer is formed by four to ten sublayers including the respective sublayers of silicon and hafnium oxide.

14. The method of claim 13 wherein:
    the forming the repair layer further comprises forming respective sublayers of:
       silica; and
       hafnium silicate.

15. The method of claim 13 wherein:
    the silicon-based layer is at least 40% by volume silicon.

16. The method of claim 13 wherein:
    the sublayers are deposited sequentially by spray deposition.

17. The method of claim 13 further comprising:
    interdiffusing the sublayers.

18. The method of claim 13 wherein:
    the respective sublayers of silicon and hafnium oxide comprise layers of silicon alternating with layers of hafnium oxide.

19. The method of claim 13 wherein:
    the ceramic matrix composite substrate is a SiC fiber-reinforced SiC matrix substrate.

20. The method of claim 13 wherein the forming of the repair layer further comprises:

applying calcium magnesium alumino-silicate (CMAS) after one or more of the sublayers are applied and before one or more others of the sublayers are applied so as to provide a progressive increase in the amount of CMAS in the repair layer.

21. The method of claim 13 wherein:

the sublayers of silicon are applied by microplasma spray and the sublayers of hafnium oxide are applied by slurry.

* * * * *